United States Patent
Mao et al.

(10) Patent No.: US 9,122,287 B2
(45) Date of Patent: Sep. 1, 2015

(54) DUAL FREQUENCY CONTROL OF BUCK-BOOST REGULATOR WITH A PASS THROUGH BAND

(75) Inventors: Hengchun Mao, Plano, TX (US); Yan-Fei Liu, Ontario (CA)

(73) Assignee: Futurewei Technologies, Inc., Plano, TX (US)

( * ) Notice: Subject to any disclaimer, the term of this patent is extended or adjusted under 35 U.S.C. 154(b) by 272 days.

(21) Appl. No.: 13/481,073

(22) Filed: May 25, 2012

(65) Prior Publication Data

US 2013/0318366 A1    Nov. 28, 2013

(51) Int. Cl.
| G05F 1/24 | (2006.01) |
| G06F 1/00 | (2006.01) |
| G05F 3/02 | (2006.01) |
| G06F 1/26 | (2006.01) |

(52) U.S. Cl.
CPC ... *G05F 3/02* (2013.01); *G06F 1/26* (2013.01)

(58) Field of Classification Search
CPC ..... H02M 3/1582; H02M 3/1584; G05F 3/02; G06F 1/26

USPC .................................................. 323/259, 282
See application file for complete search history.

(56) References Cited

U.S. PATENT DOCUMENTS

| 6,100,676 A * | 8/2000 | Burstein et al. ............... 323/283 |
| 7,952,900 B2 * | 5/2011 | Tomiyoshi et al. ............. 363/98 |
| 8,120,336 B2 * | 2/2012 | Mehas et al. ................... 323/224 |
| 2004/0027101 A1 * | 2/2004 | Vinciarelli ..................... 323/259 |
| 2007/0174641 A1 * | 7/2007 | Cornwell et al. ............. 713/300 |
| 2008/0024108 A1 * | 1/2008 | Jacob et al. ................... 323/349 |

* cited by examiner

*Primary Examiner* — Mark Connolly

(57) ABSTRACT

Dual frequency control of first and second pairs of switches of a buck-boost regulator with pass through band is disclosed. In buck and boost modes respectively a first pair of the switches is operated at high frequency and a second pair of the switches is operated at low frequency. In pass through mode, both pairs of switches are operated at low frequency. Dual frequency control and operation of the pairs of switches enables current sharing between positive and negative power leads in buck, boost and pass-through modes.

20 Claims, 15 Drawing Sheets

DUAL FREQUENCY CONTROL OF BUCK-BOOST REGULATOR WITH A PASS THROUGH BAND

BACKGROUND

Electronic equipment includes groupings of electronic circuits and components that are designed to provide one or more complex functions. The electronic equipment receives power from an energy source that is used to power its electronic circuits and components. The power that is received is input to a power system of the electronic equipment that provides voltage outputs that are delivered to a plurality of loads. The power system often includes one or more voltage regulators that operate in parallel.

Voltage regulators are used to regulate the power that is delivered to one or more circuit cards such that voltage and current stresses on components that reside on a circuit card are reduced. They are used to convert an input voltage that is received from a given energy source to an output voltage that falls within a voltage range that is suitable for the components that reside on the circuit cards. By using a voltage regulator in the power system of electronics equipment, the power density of associated backplanes and line cards can be increased. Voltage regulators that provide a buck-boost function can be a combination of buck and boost converters, or can be a buck-boost converter. Voltage regulator types can include isolated voltage regulators and non-isolated voltage regulators. Because isolated voltage regulators are more complex and less efficient than are non-isolated voltage regulators that have the same power and voltage ratings, it is advantageous to use non-isolated voltage regulators in power systems.

When multiple voltage regulators are connected in parallel, satisfactory current sharing between respective parallel connected voltage regulators should be maintained for proper operation. Usually, the purpose of assuring satisfactory current sharing is to cause each voltage regulator of multiple voltage regulators to output about the same power, i.e. have about the same output current. However, unlike in an isolated voltage regulator, in a non-isolated voltage regulator, when multiple voltage regulators are coupled in parallel, the current flowing in its positive input lead and the current flowing in its negative input lead are not necessarily the same. This is because the input power leads to respective voltage regulators of a complex power system might not have the same voltage or resistance. This also applies to the current flowing in the output leads of a non-isolated voltage regulator.

Conventional power sharing methodologies alone cannot guarantee that during operation the positive and negative input and output power leads of non-isolated voltage regulators will have the same amount of current. However, a power lead of a voltage regulator can be damaged if it carries significantly more current than its counterpart. Because input power leads are usually longer than output power leads in actual power systems, unsatisfactory current sharing is more problematic for input power leads. For safe operation it is desirable to maintain a satisfactory current balance between the positive input lead and the negative input lead of each voltage regulator.

In power systems that include a plurality of voltage regulators that have current sharing control, current balance between the positive and negative input power leads is required. Conventionally, such current balance is maintained by adjusting the gate drive voltage of a switch that is located in the positive or the negative power path of a voltage regulator such that the total resistance in that path is basically equal among parallel connected voltage regulators. However, this approach can result in an unsatisfactorily high power loss in the switch.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Conventional approaches to maintaining satisfactory current balance between positive and negative input leads of a plurality of parallel non-isolated voltage regulators can result in high power loss. A buck-boost regulator with dual-frequency control of first and second switching circuitry that addresses these shortcomings is disclosed. However, the claimed embodiments are not limited to implementations that address any or all of the aforementioned shortcomings. The buck-boost regulator includes switching circuitry that is operated at a first frequency and switching circuitry that is operated at a second frequency. The first frequency and the second frequency can be equal in pass-through mode and are different in buck mode and boost mode. The aforementioned dual frequency control of the switching circuitry enables the control of buck-boost regulator output voltage, the current between its positive and negative leads and the current between respective regulators coupled in parallel. Moreover, the dual frequency control of first and second switching circuitry of the buck-boost regulator provides current control with low power loss and efficient power transfer.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1A:
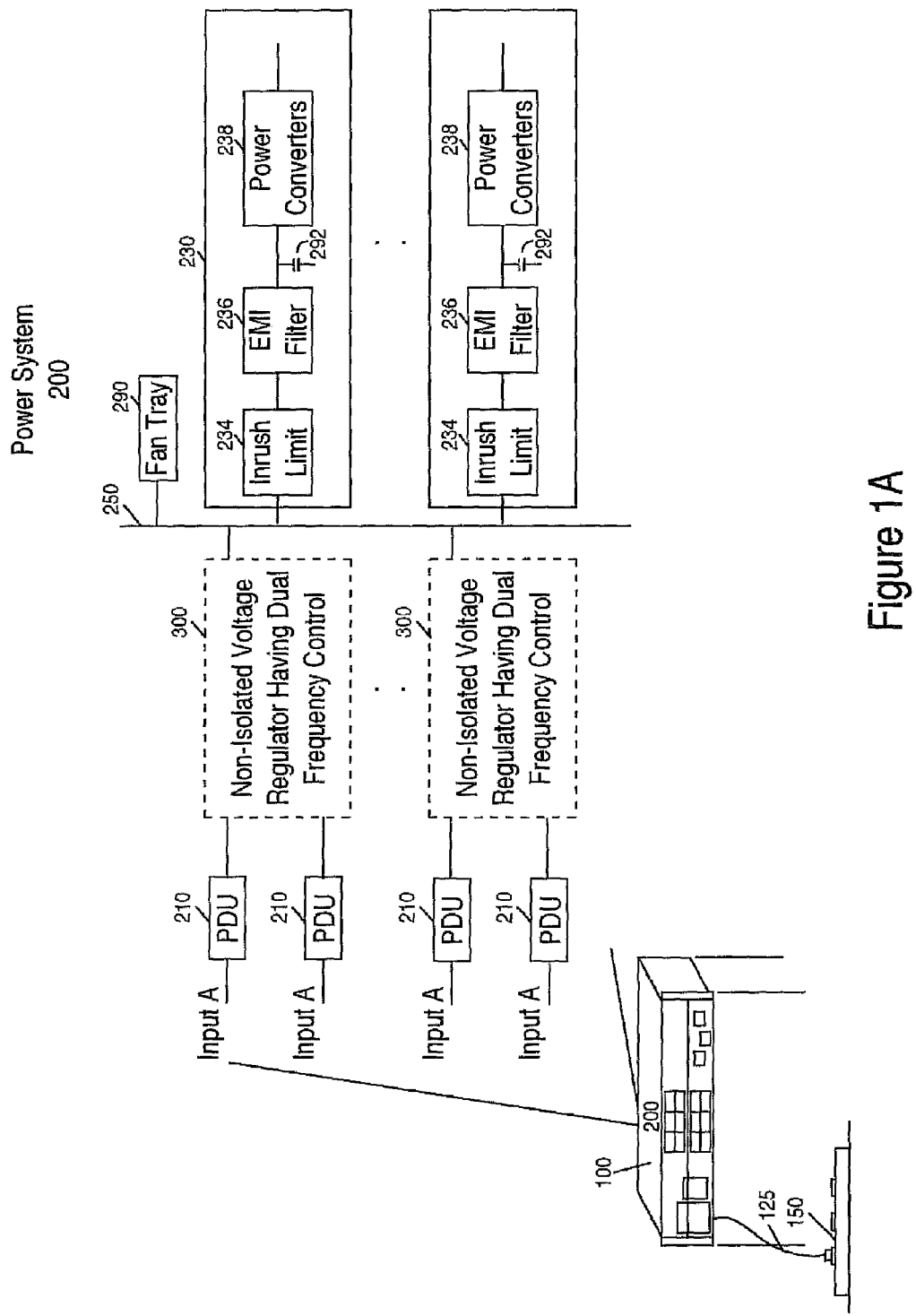
FIG. 1A shows an exemplary operational setting of a buck-boost voltage regulator having dual frequency control and pass through band according to one embodiment.

Exemplary Operational Setting of Buck-Boost Regulator Having Dual Frequency Control with a Pass Through Band According to One Embodiment FIG. 1A shows an exemplary operational setting of a buck-boost voltage regulator 300 (e.g., non-isolated) having dual frequency control according to one embodiment (hereinafter non-isolated buck-boost regulator 300). The exemplary operational setting of non-isolated buck-boost voltage regulator 300 is an electronic device 100 that receives power from an energy source 150 and contains a power system that includes non-isolated buck-boost voltage regulator 300. In one embodiment, non-isolated buck-boost voltage regulator 300 features dual frequency control of both buck switching circuitry and boost switching circuitry (discussed in detail herein with reference to FIGS. 2A-3C). Such dual frequency control provides control of the output voltage of non-isolated buck-boost regulator 300, the current balance between its positive and negative input leads and the current sharing between respective non-isolated buck-boost regulators that are coupled in parallel (see FIG. 1A). FIG. 1A shows electronic equipment 100, power chord 125, power source 150 and power system 200. In the FIG. 1A embodiment, power system 200 can include one or more non-isolated buck-boost voltage regulators 300.

Referring to FIG. 1A, in one embodiment, power system 200 comprises a plurality of PDUs 210 coupled to input voltages, a plurality of non-isolated buck-boost voltage regulators 300 coupled to PDUs 210, and a plurality of circuit cards 230 coupled to non-isolated buck-boost voltage regulators 300. Power system 200 can also comprise a bus or backplane 250 that is positioned between non-isolated buck-boost voltage regulators 300 and circuit cards 230, and a fan tray 290 that is coupled to bus 250. Each circuit card 230 can include an inrush limit circuit 234 and/or an EMI filter 236 coupled to bus 250, and a power converter/brick 238 coupled to EMI filter 236. A capacitor 292 can also be positioned between power converter/brick 238 and EMI filter 236, as shown in FIG. 1A. In one embodiment, the PDUs 210 and the non-isolated buck-boost voltage regulators 300 can be located on the same platform as the circuit cards 230 or separately at a different site.

Referring to again to FIG. 1A, in one embodiment, electronic equipment 100 can be configured to receive power from an AC power source 150 that is rectified to provide DC voltage inputs (e.g., input A and input B) to PDUs 210. In other embodiments, the DC voltage inputs can be provided from a DC power source such as a battery. PDUs 210 provide one or more DC power/voltage inputs to one or more non-isolated buck-boost voltage regulators 300. In one embodiment, non-isolated buck-boost voltage regulators 300 provide voltages that lie within a relatively narrow voltage range (relative to the voltage inputs) to some components of power system 200 and to circuit cards 230. Such voltages reduce power loss and voltage and current stresses, on those components, and on circuit cards 230.

As discussed above, in one embodiment, dual frequency control of both buck and boost switching circuitry of non-isolated buck-boost voltage regulators 300 provides control of the output voltage of the regulators, the current balance between positive and negative input leads of the regulators and the current sharing between respective regulators that are coupled together in parallel (see FIG. 1A). In one embodiment, control of these parameters is effected differently in buck mode, boost mode and pass-through mode.

In order to effect control of the aforementioned parameters, in buck mode, buck switching circuitry of non-isolated buck-boost voltage regulators 300 is operated at high frequency and boost switching circuitry of non-isolated buck-boost voltage regulators 300 is operated at low frequency. Moreover, in boost mode, boost switching circuitry of non-isolated buck-boost voltage regulators 300 is operated at high frequency and buck switching circuitry of non-isolated buck-boost voltage regulators 300 is operated at low frequency. And, if a pass-through mode operation is required, in pass-through mode, both buck switching circuitry of non-isolated buck-boost voltage regulators 300 and boost switching circuitry of non-isolated buck-boost voltage regulators 300 can be operated at low frequencies (and the frequencies of the two circuitries can be the same). The operation of the buck switching circuitry and the boost switching circuitry of non-isolated buck-boost voltage regulators 300 in respective operational modes is discussed in detail herein with reference to FIGS. 2A-3C.

Non-Isolated Buck-Boost Voltage Regulator Operational Modes

Figure 1B:
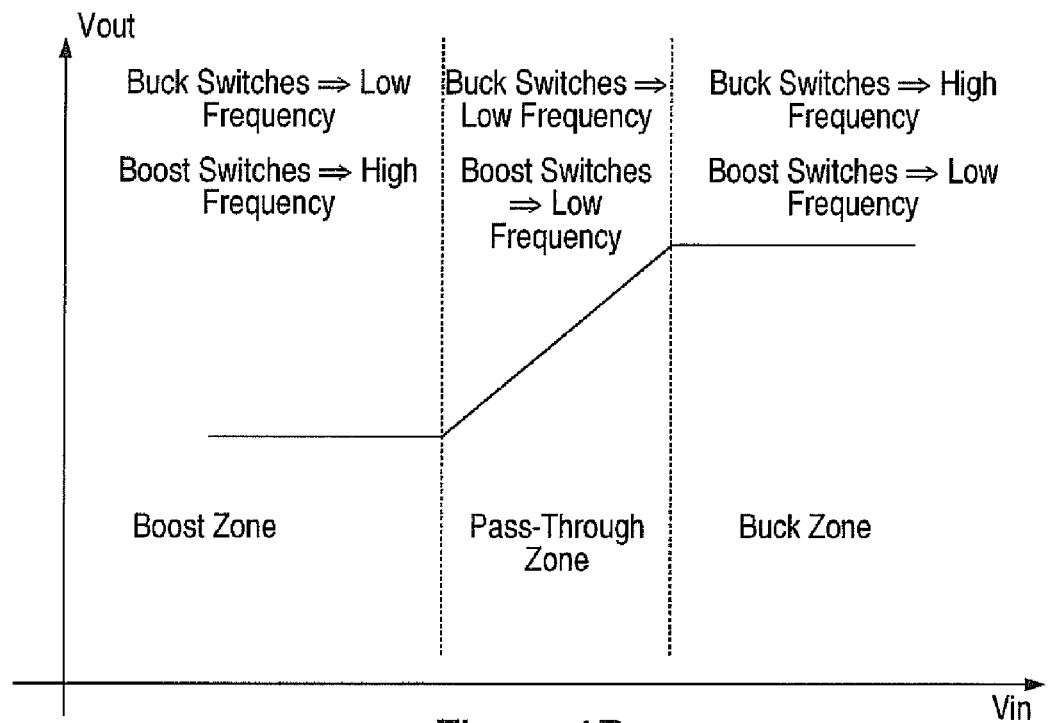
FIG. 1B shows the relationships between Vin and Vout of a non-isolated buck-boost voltage regulator with respect to various operational modes of a non-isolated buck-boost voltage regulator according to one embodiment.

FIG. 1B shows the relationships between Vin and Vout of non-isolated buck-boost voltage regulators 300 of FIG. 1A with respect to various operational modes of non-isolated buck-boost voltage regulators 300 according to one embodiment. As such, FIG. 1B illustrates the character of the voltage regulating function of non-isolated buck-boost voltage regulators 300 according to one embodiment. Please note that not all three operational modes are necessary. For example, some systems may have just two operational modes.

In one embodiment, the various operational modes comprise buck mode, boost mode and pass-through mode. Referring to FIG. 1B, an output voltage (Vout) from non-isolated buck-boost voltage regulators 300 is regulated at about constant value in buck mode and boost mode and to vary similarly to an input voltage (Vin) of non-isolated buck-boost voltage regulators 300 in pass-through mode. For instance, Vout can be regulated to be equal to a maximum of the desired output voltage range in buck mode and equal to a minimum of a desired output voltage range in boost mode.

Referring again to FIG. 1B, in buck mode buck switching circuitry of non-isolated buck-boost voltage regulators 300 is operated at high frequency and boost switching circuitry of non-isolated buck-boost voltage regulators 300 is operated at low frequency. In boost mode buck switching circuitry of non-isolated buck-boost voltage regulators 300 is operated at low frequency and boost switching circuitry of non-isolated buck-boost voltage regulators 300 is operated at high frequency. In pass-through mode both buck switching circuitry of non-isolated buck-boost voltage regulators 300 and boost switching circuitry of non-isolated buck-boost voltage regulators 300 are operated at low frequency.

Figure 1C:
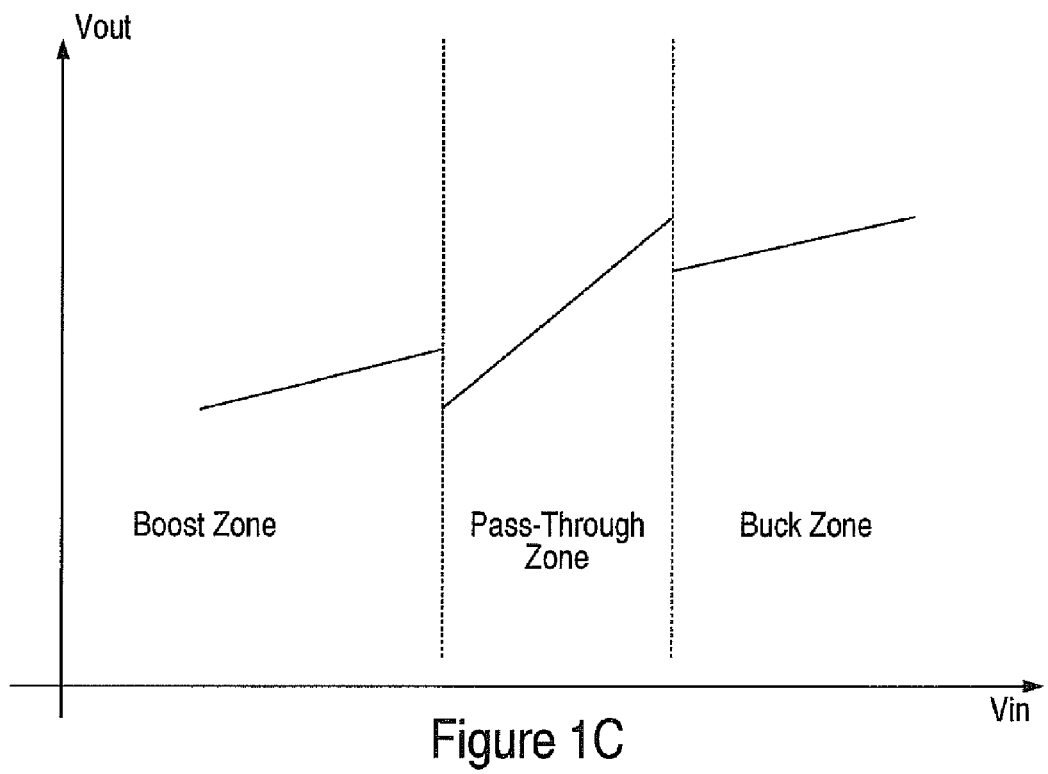
FIG. 1C illustrates the relationship between Vin and Vout corresponding to various operational modes of a non-isolated buck-boost voltage regulator according to another embodiment.

FIG. 1C illustrates the relationship between Vin and Vout corresponding to various operational modes of non-isolated buck-boost voltage regulators 300 of FIG. 1A according to another embodiment. In the FIG. 1C embodiment, buck mode and/or boost mode provides non-constant Vout based on Vin. However, the dual frequency control of buck switching circuitry and boost switching circuitry of non-isolated buck-boost voltage regulators 300 that corresponds to the various operating modes of non-isolated buck-boost voltage regulators is similar to that of the embodiment of FIG. 1B. A detailed description of non-isolated buck-boost voltage regulators 300, including its buck switching circuitry and boost switching circuitry, is provided below.

Figure 2A:
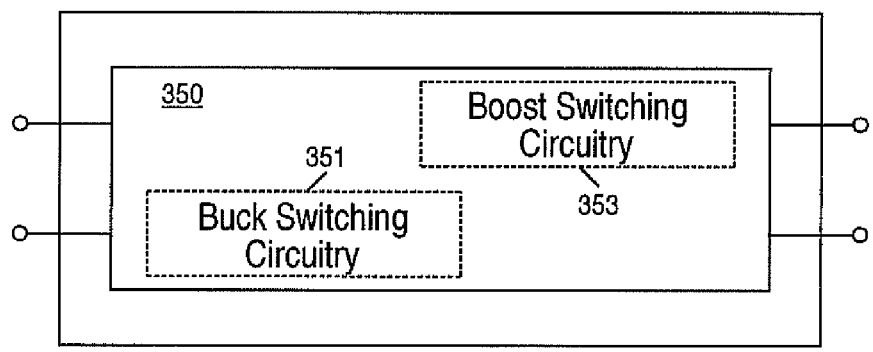
FIG. 2A shows switching components of non-isolated buck-boost voltage regulator according to one embodiment.

Exemplary Non-Isolated Buck-Boost Voltage Regulator Having Dual Frequency Control with a Pass Through Band According to One Embodiment FIG. 2A shows switching components of a non-isolated buck-boost voltage regulator 300 according to one embodiment. In one embodiment, non-isolated buck-boost voltage regulator 300 comprises a converter 350 that comprises buck switching circuitry 351 and boost switching circuitry 353. In one embodiment, non-isolated buck-boost voltage regulator 300 can comprise a buck-boost converter or a buck converter and a boost converter. In one embodiment, buck switching circuitry 351 and boost switching circuitry 353 can include but are not limited to mechanical switches such as relays and/or semiconductor switches such as metal-oxide-semiconductor field-effect transistors, bipolar junction transistors, insulated gate bipolar transistors, or combinations thereof. In one embodiment, dual frequency control of both buck switching circuitry 351 and boost switching circuitry 353 of converter 350 enables the control of the output voltage of non-isolated buck-boost voltage regulator 300, the current balance between positive and negative leads of non-isolated buck-boost voltage regulator 300 and the current sharing between different non-isolated buck-boost voltage regulators 300 coupled in parallel as described herein.

Buck-Boost Implementation According to One Embodiment

Figure 2B:
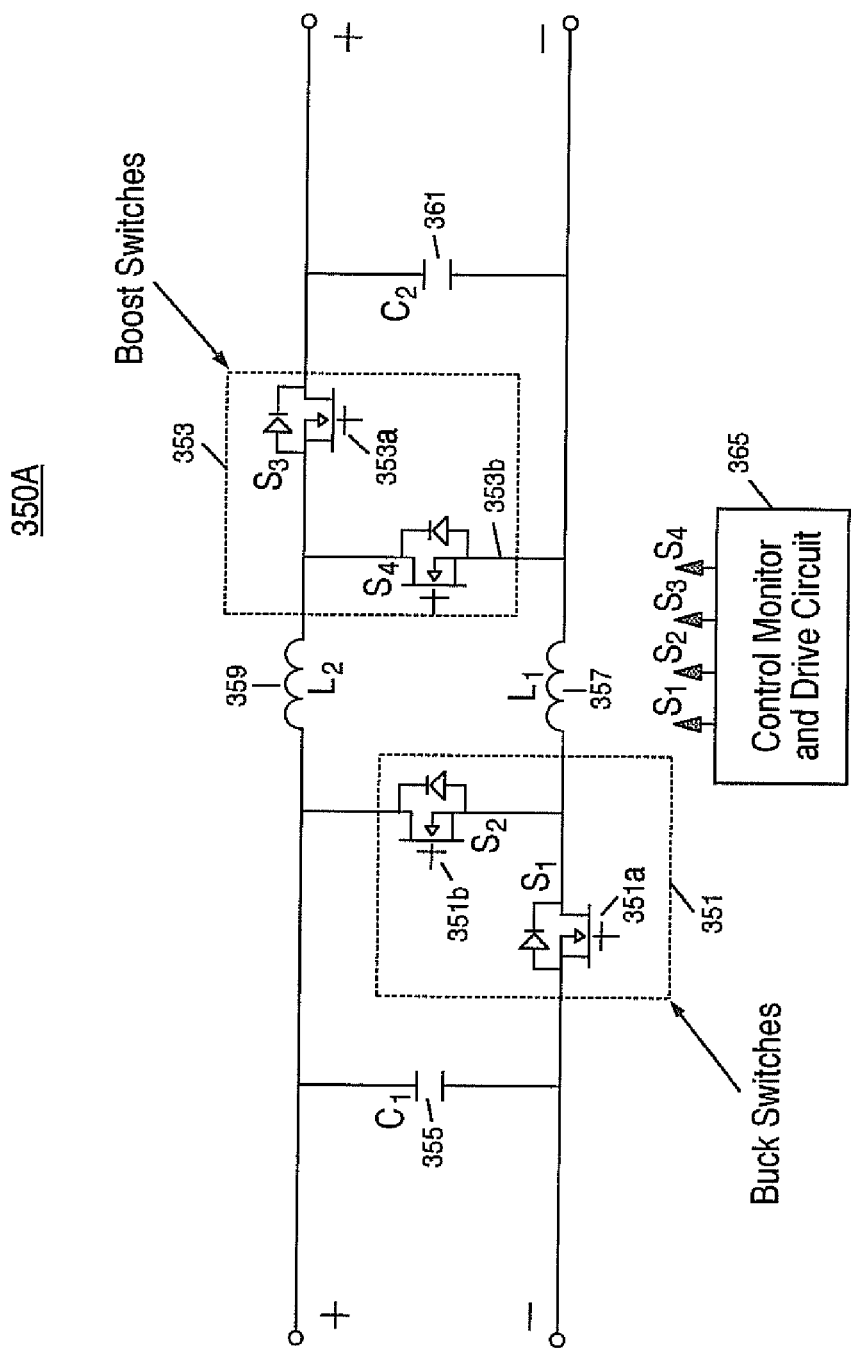
FIG. 2B shows a buck-boost implementation of converter that can support current sharing function on both positive and negative power leads according to one embodiment.

FIG. 2B shows a buck-boost implementation 350A of converter 350 that supports current sharing function on both positive and negative power leads according to one embodiment. In one embodiment, buck-boost implementation 350A of converter 350 can comprise input capacitor C1 355, buck switching circuitry 351 (buck switch S1 351a and buck switch S2 351b, e.g., a freewheeling synchronous rectifier switch, as shown in dashed box), inductor L1 357, inductor L2 359, boost switching circuitry 353 (boost switch S4 353b and boost switch S3 353a, e.g., a boost synchronous rectifier switch, as shown in dashed box) and output capacitor C2 361. In one embodiment, one or both of the synchronous rectifier switches S2 and S3 can be replaced with a diode (diodes), which doesn't need gate drive control but suffers from higher power loss. Additionally, in one embodiment, buck-boost implementation 350A can comprise control monitor and drive circuit 365 that provides separate control signals for each of buck switch S1 351a, buck switch S2 351b, boost switch S3 353a and boost switch S4 353b. As shown in FIG. 2B, in one embodiment, boost switch S1 351a and buck switch S3 353a can be respectively positioned on the positive and negative leads of buck-boost implementation 350A instead of being positioned on a single lead, which allows current sharing control on each of the leads. Moreover, inductor function can be split between positive and negative leads by positioning inductors L1 357 and L2 359 on the positive and negative leads instead of using a single inductor on a single path.

Buck and Boost Implementation According to One Embodiment

Figure 2C:
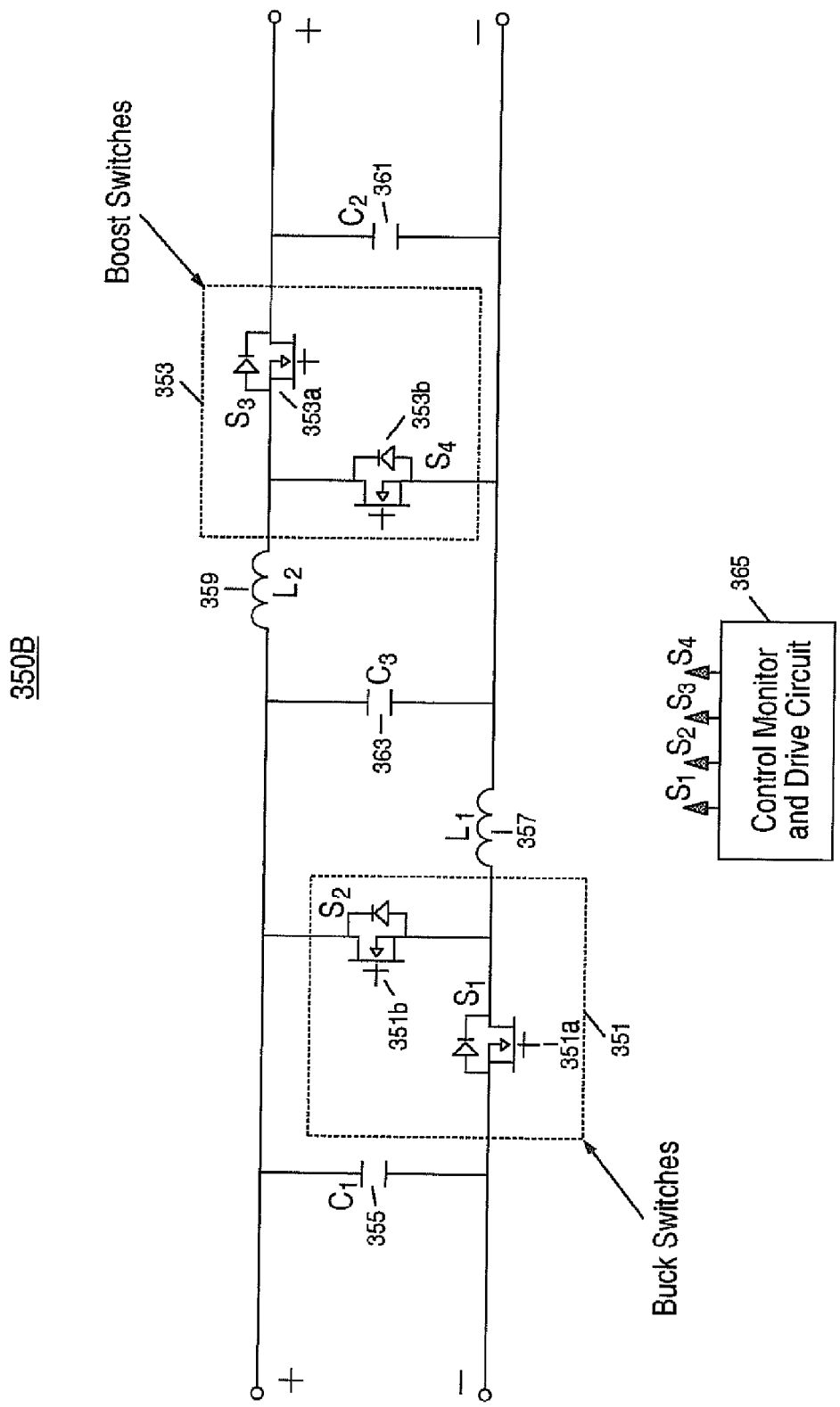
FIG. 2C shows a buck-boost implementation of converter that comprises a buck converter and a boost converter coupled in series that can support current sharing function on both positive and negative power leads according to one embodiment.

FIG. 2C shows a buck-boost implementation 350B of converter 350 that comprises a buck converter and a boost converter coupled in series that can support current sharing function on both positive and negative power leads according to one embodiment. Buck-boost implementation 350B can comprise an input capacitor C1 355, buck switching circuitry 351 (buck switch S1 351a and buck switch S2 351b, e.g., a freewheeling synchronous rectifier switch, shown in dashed box), intermediate capacitor C3 363, inductor L1 357, inductor L2 359, boost switching circuitry 353 (boost switch S4 353a and boost synchronous rectifier switch S3 353b shown in dashed box) and an output capacitor C2 361. Additionally, buck-boost implementation 350B can comprise a control monitor and drive circuit 365 that provides separate control signals for each of buck switch S1 351a, buck switch S2 351b, boost switch S3 353a and boost switch S4 353b. In one embodiment, one or both of the synchronous rectifier switches S2 351b and S3 353a can be replaced with a diode (diodes), which doesn't need gate drive control but suffers from higher power loss.

In one embodiment, input capacitor C1 355, buck switch S2 351b, intermediate capacitor C3 363, buck switch S1 351a and inductor L1 357 corresponds to the buck converter section of buck-boost implementation 350B and intermediate capacitor C3 363, boost switch S4 353b, output capacitor C2 361, inductor L2 359 and boost switch S3 353a corresponds to the boost converter section of the buck-boost converter 350B. As shown in FIG. 2C, in one embodiment, S1 351a, L1

357, L2 359 and S3 353a can be distributed between the positive and negative leads of buck-boost converter 350B to facilitate current sharing control on each of the leads. For example, S1 351a and L1 357 can be positioned on the negative lead of buck-boost converter 350B and L2 359 and S3 353a can be positioned on the positive lead of buck-boost converter 350B. Additionally, S1 351a and S2 351b in the buck converter section, and S3 353a and S4 353b in the boost converter section, can be controlled, e.g., in a synchronous manner, using the same control monitor and drive circuit 365. In accordance with one embodiment, the combined control of the buck converter and boost converter sections facilitate current balancing on both leads.

Operation

Figure 3A:
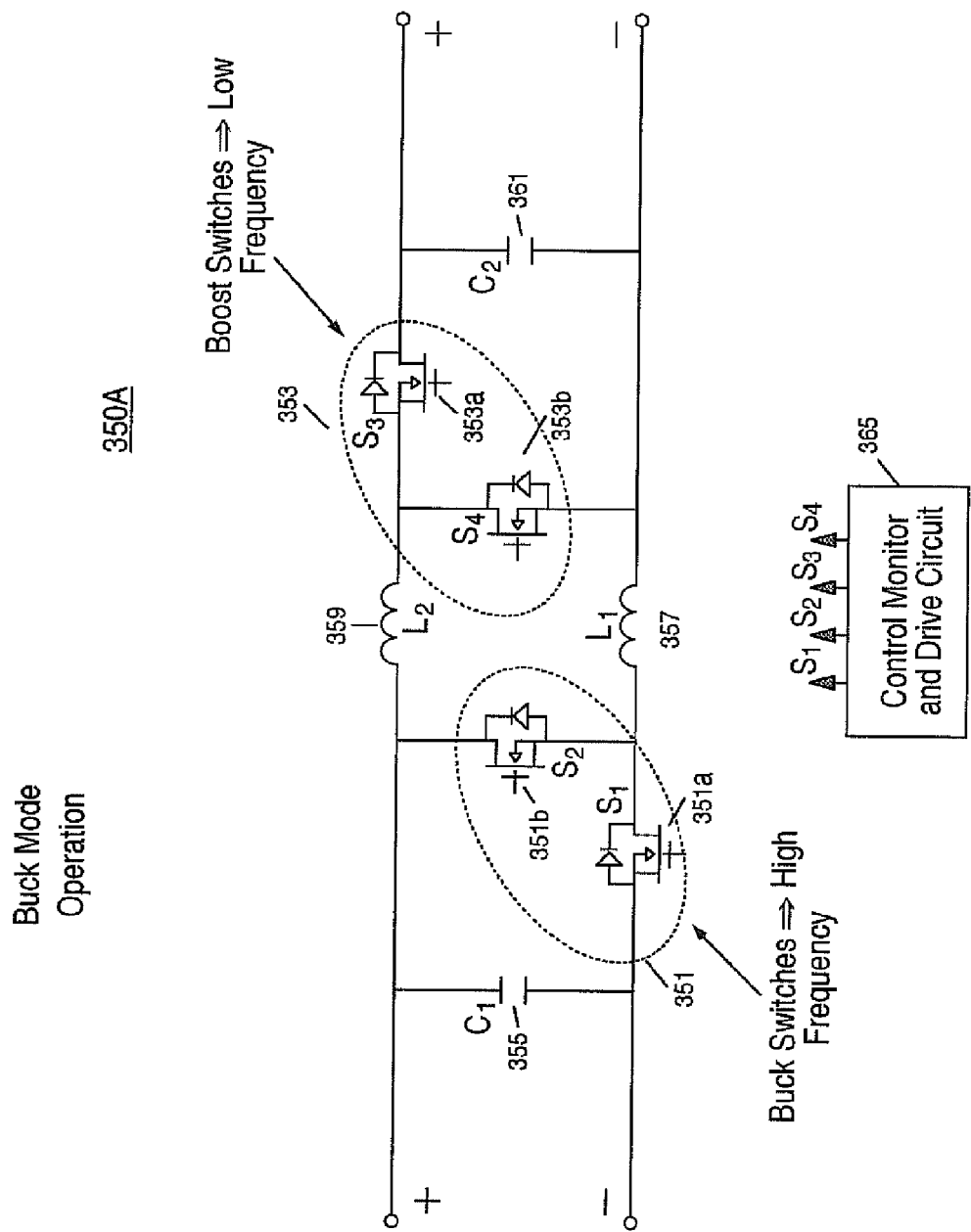
FIG. 3A illustrates details of buck mode operation of an exemplary buck-boost converter according to one embodiment.
Figure 3B:
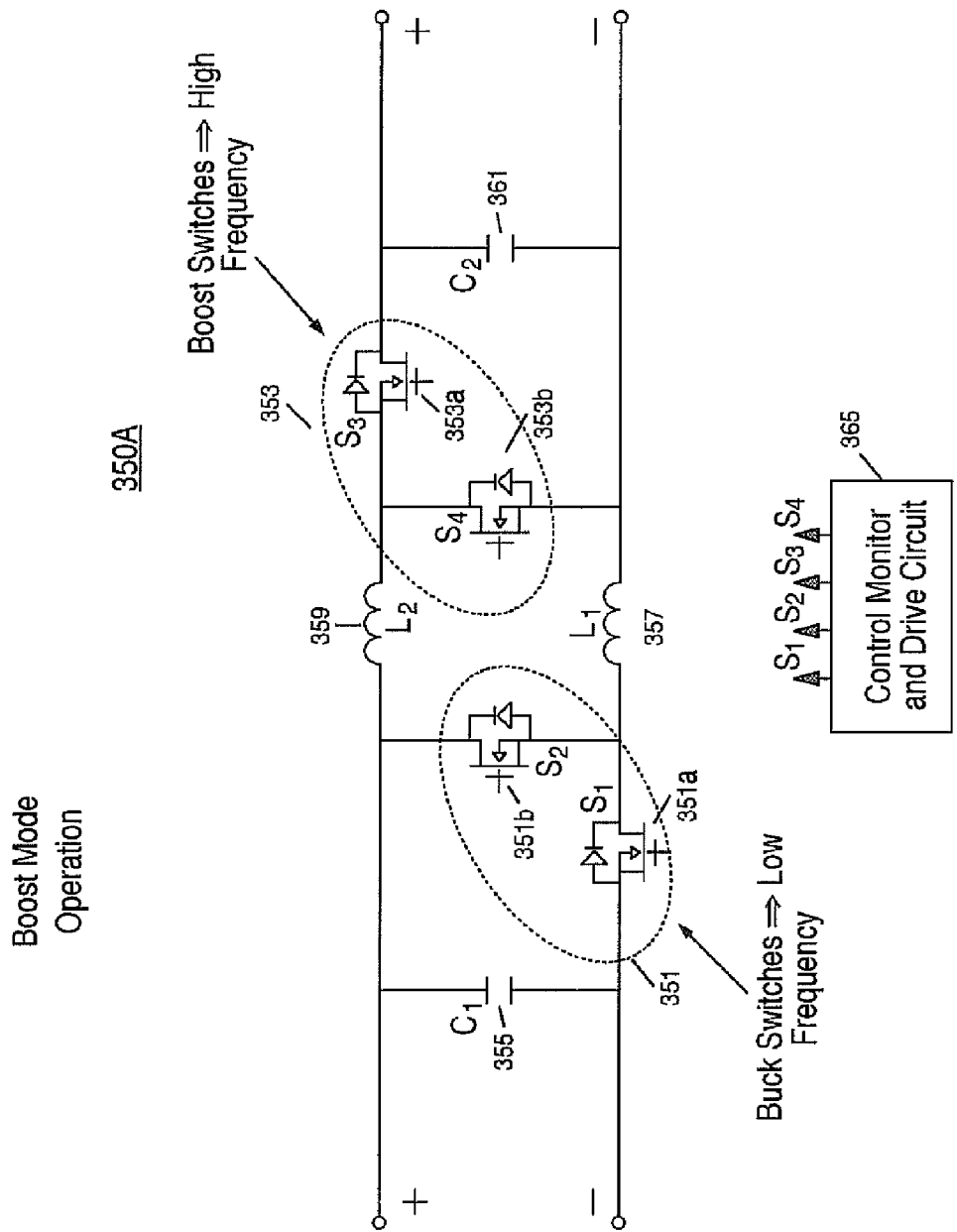
FIG. 3B illustrates details of boost mode operation of an exemplary buck-boost converter according to one embodiment.
Figure 3C:
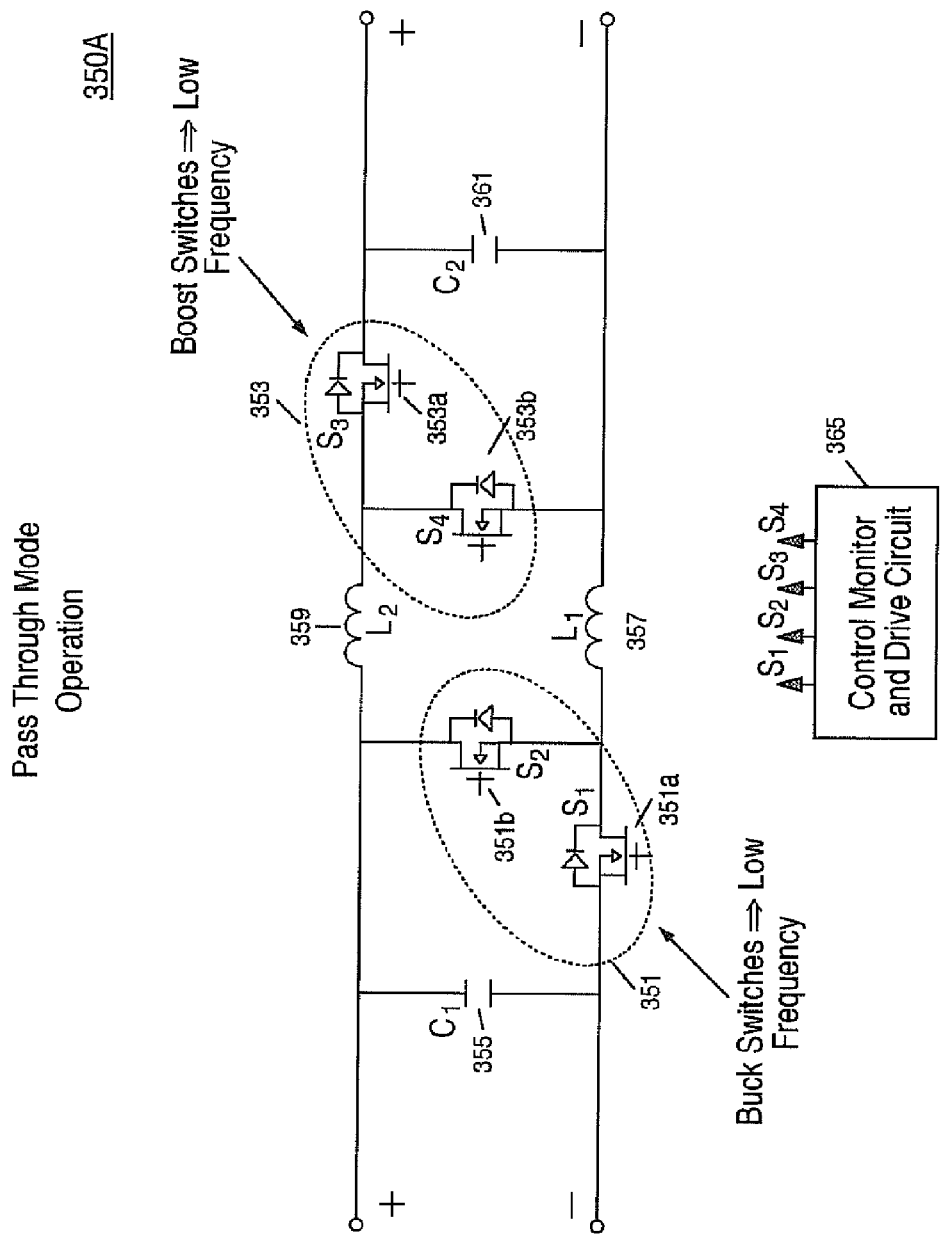
FIG. 3C illustrates details of pass-through mode operation of an exemplary buck-boost converter according to one embodiment.

FIGS. 3A-3C illustrate details of the operation of an exemplary non-isolated buck-boost voltage regulator according to one embodiment. These operation details are only exemplary. In other embodiments other operations can be performed. For example, one or more operation modes may be absent in some applications. The operation of non-isolated buck-boost voltage regulator is described with reference to buck-boost converter implementation 350A previously shown in FIG. 2B.

Buck Mode Operation

Referring to FIG. 3A, in buck mode operation, buck switches S1 351a and S2 351b (encircled with dashed line to indicate high frequency) are operated at high frequency and boost switches S3 353a and S4 353b (encircled with solid line to indicate low frequency) are operated at low frequency. In particular, boost switch S3 353a is operated with a high duty cycle at low frequency and boost switch S4 353b is operated with a low duty cycle at low frequency. The conduction of buck switch S1 351a is complementary to the conduction of buck switch S2 351b, and a short dead-time may exist between the conduction of the two switches. Similarly, the conduction of boost switch S4 353b is complementary to the conduction of boost switch S3 353a. In one embodiment, boost switches S3 353a and S4 353b are controlled to regulate the current flowing through the positive input lead of buck-boost converter 350A. And, buck switches S1 351a and S2 351b are controlled to regulate the output voltage of buck-boost converter 350A and the current flowing through its negative input lead.

In one embodiment, boost switches S3 353a and S4 353b can be operated at 20 Khz and buck switches S1 351a and S2 351b can be operated at 200 Khz (a difference between the high and low frequency of an order of magnitude, however, in one embodiment the ratio of the high frequency to the low frequency can be at least two). In other embodiments, boost switches S3 353a and S4 353b and buck switches 351a and 351b can be operated at other low and high frequencies respectively. In one embodiment, the operation of buck switches S1 351a and S2 351b effects negative input lead current sharing with droop current sharing (or with active current sharing). In one embodiment, boost switch S4 353b can be used to cause the positive input lead current to be approximately the same as the negative input lead current. In one embodiment, the current control loop that causes the positive input lead current to follow the negative input lead current is designed to be substantially slower than the current sharing loop that causes negative input lead current sharing among respective parallel coupled buck-boost regulators (see parallel coupled non-isolated buck-boost regulators 300 in FIG. 1A which comprise respective parallel coupled buck-boost converters 350B in one embodiment). In one embodiment, when the positive input lead current is lower than the negative input lead current, the duty cycle of boost switch S4 353b can be increased (and vice versa).

Boost Mode Operation

Referring to FIG. 3B, in boost mode operation, buck switches S1 351a and S2 351b (encircled with solid line to indicate low frequency) are operated at low frequency and boost switches S3 353a and S4 353b (encircled with dashed line to indicate high frequency) are operated at high frequency. In particular, buck switch S1 351a is operated with a high duty cycle at low frequency and buck switch S2 351b is operated with a low duty cycle at low frequency. In one embodiment, boost switches S3 353a and S4 353b control buck-boost converter 350A output voltage and regulate the current flowing through its positive input lead. Moreover, buck switches S1 351a and S2 351b regulate the current flowing through the negative input lead of buck-boost converter 350A.

In one embodiment, buck switches S1 351a and S2 351b can be operated at 20 Khz and boost switches S3 353a and S4 353b can be operated at 200 Khz (a difference between the high and low frequency of an order of magnitude, however, in one embodiment the ratio of the high frequency to the low frequency can be at least two). In other embodiments, buck switches S1 351a and S2 351b and boost switches S3 353a and S4 353b can be operated at other low and high frequencies respectively. In one embodiment, boost switches S3 353a and S4 353b effect positive input lead current sharing with droop current sharing (or active current sharing) to effect current sharing among respective parallel coupled buck-boost regulators. In one embodiment, buck switch S1 351a regulates the negative input lead current to be equivalent to the positive input lead current. In one embodiment, the current control loop that causes the negative input lead current to be approximately the same as the positive input lead current is designed to be substantially slower than the current sharing loop that causes positive input lead current sharing among respective parallel coupled buck-boost regulators (see parallel coupled buck-boost regulators in FIG. 1A). In one embodiment, when the negative input lead current is lower in value than the positive input lead current, the duty cycle of buck switch S1 351a can be increased (and vice versa).

Pass-Through Mode Operation

Referring to FIG. 3C, in pass through mode buck switches S1 351a and S2 351b (encircled with solid line to indicate low frequency) are operated at low frequency and boost switches S3 353a and S4 353b (encircled with solid line to indicate low frequency) are operated at low frequency. In particular, switches S1 351a and S3 353a are controlled to operate with high duty cycle at low frequency and switches S2 351b and S4 353b are controlled to operate with low duty cycle at a low frequency. In one embodiment, buck switches S1 351a and S2 351b control the current flowing through the negative input lead of buck-boost converter 350A and boost switches S3 353a and S4 353b control the current flowing through the positive input lead of buck-boost converter 350A.

In one embodiment, boost switches S3 353a and S4 353b can be operated at 20 Khz and buck switches S1 351a and S2 351b can be operated at 20 Khz. In other embodiments the boost switches and the buck switches can be operated at other low frequencies. In one embodiment, buck switches S1 351a and S2 351b effect negative input lead current sharing with droop current sharing (or with active current sharing) among parallel-coupled buck-boost converters. In one embodiment, boost switches S3 353a and S4 353b effect positive input lead current sharing with droop current sharing (or with active current sharing) among parallel-coupled buck-boost converters. Moreover, in one embodiment, boost switch S4 353b can be used to cause the positive input lead current to be approximately the same as the negative input lead current. In one embodiment, the current control loop that causes the positive input lead current to follow the negative input lead current is designed to be substantially slower than the current sharing loop that causes negative input lead current sharing among respective parallel coupled buck-boost regulators (see parallel coupled non-isolated buck-boost regulators 300 in FIG. 1A which comprise respective parallel coupled buck-boost converters 350B in one embodiment). In one embodiment, when the positive input lead current is lower than the negative input lead current, the duty cycle of boost switch S4 353b can be increased to increase the positive input lead current (and vice versa).

Exemplary Timing Diagrams

Figure 4A:
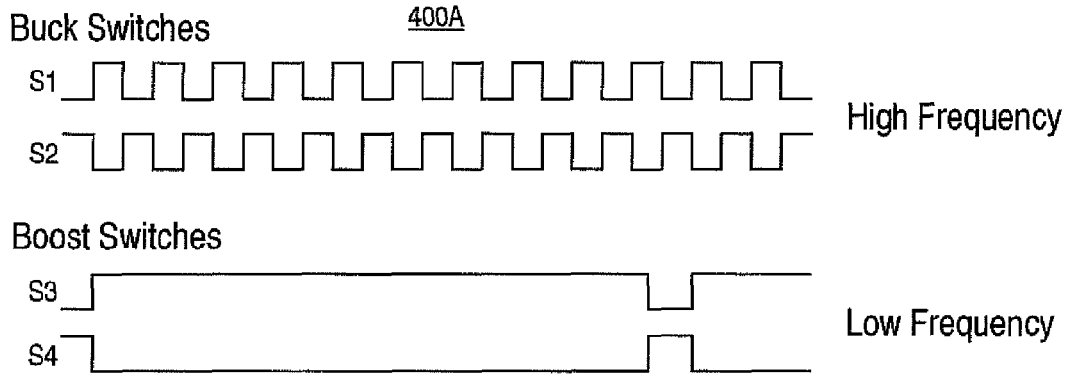
FIG. 4A shows an exemplary timing diagram that corresponds to the buck mode of a non-isolated buck-boost regulator according to one embodiment.
Figure 4B:
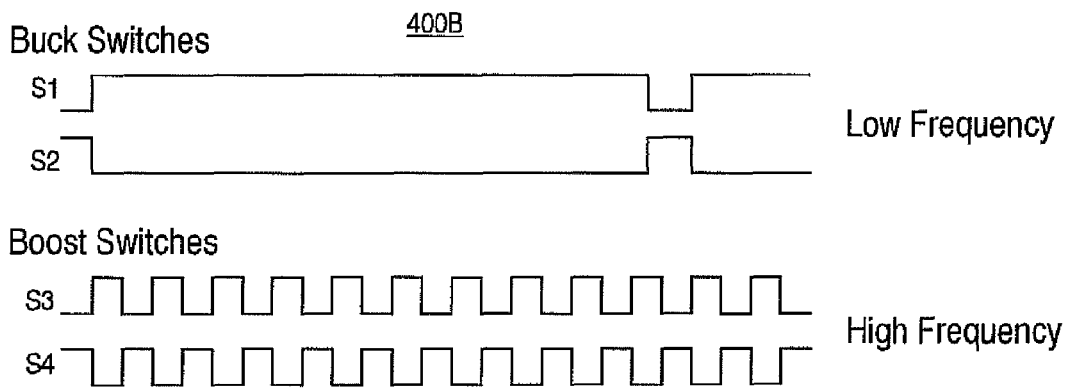
FIG. 4B shows an exemplary timing diagram that corresponds to the boost mode of a non-isolated buck-boost regulator according to one embodiment.
Figure 4C:
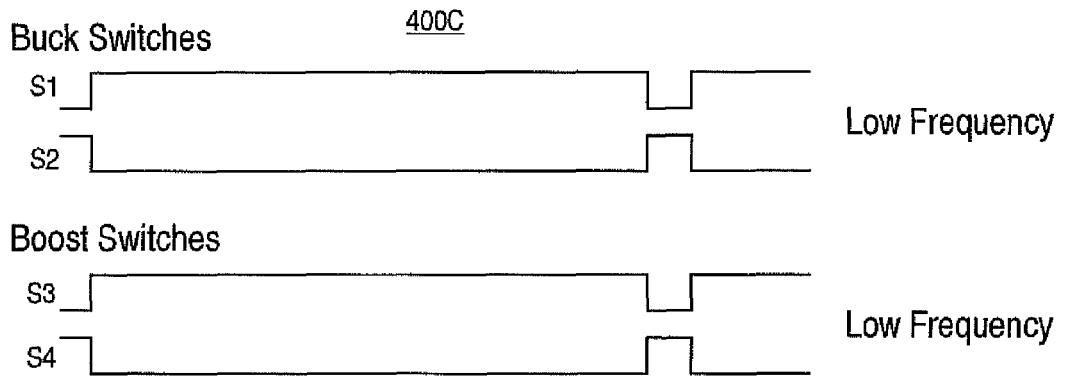
FIG. 4C shows an exemplary timing diagram that corresponds to the pass through mode of a non-isolated buck-boost regulator according to one embodiment.

FIGS. 4A-4C show exemplary timing diagrams that correspond to the buck mode, boost mode and pass through mode of a non-isolated buck-boost regulator (e.g., 300 in FIG. 2A) according to one embodiment. The following discussion references the buck and boost switches shown in FIGS. 3A-3C. Referring to FIG. 4A, timing diagram 400A shows that in buck mode buck switches S1 351a and S2 351b are operated at a high frequency rate and boost switches S3 353a and S4 353b are operated at a low frequency rate. Referring to FIG. 4B, timing diagram 400B shows that in boost mode buck switches S1 351a and S2 351b are operated at a low frequency rate and boost switches S3 353a and S4 353b are operated at a high frequency rate. Referring to FIG. 4C, timing diagram 400C shows that in pass through mode buck switches S1 351a and S2 351b are operated at a low frequency rate and boost switches S3 353a and S4 353b are operated at a low frequency rate.

Figure 5:
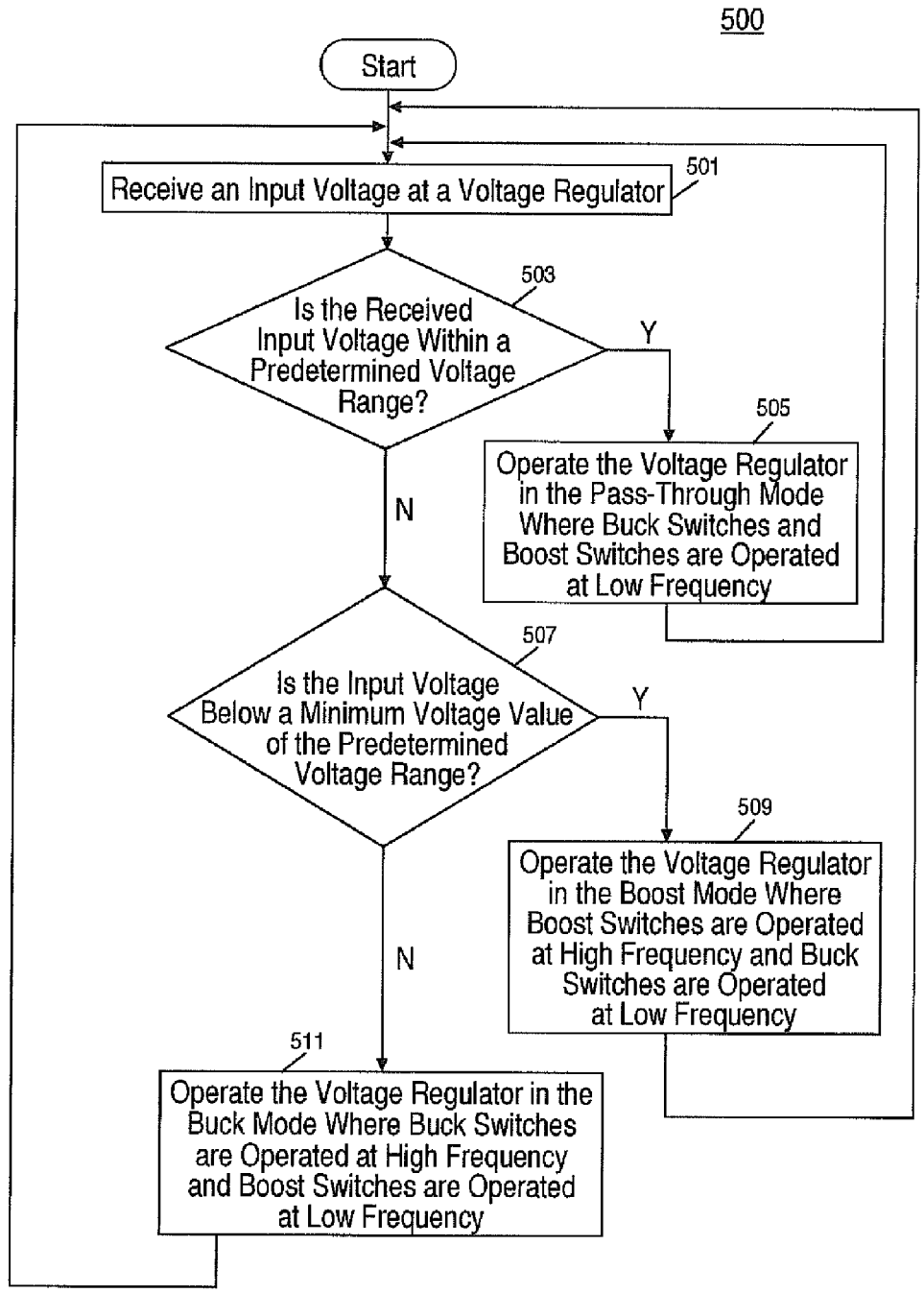
FIG. 5 shows a flowchart of the steps performed in a method for dual frequency control of a non-isolated buck-boost regulator having a pass through band according to one embodiment.

Exemplary Method for Dual Frequency Control of a Buck-Boost Regulator with a Pass Through Band According to One Embodiment FIG. 5 shows a flowchart 500 of the operations performed in a method for dual frequency control of a non-isolated buck-boost regulator (e.g., 300 in FIG. 2A) with a pass through band according to one embodiment. The flowchart includes processes that, in one embodiment can be carried out by electrical components or processors under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

At 501, an input voltage is received at a voltage regulator (e.g., 300 in FIG. 2A). In one embodiment, the input voltage can be received from a single power source, a combined power source, or can be selected from a plurality of received inputs from a plurality of power sources. At 503, it is determined whether the received input voltage lies within a predetermined voltage range. If it is determined that the received input voltage lies within the predetermined voltage range then 505 is performed and if it is determined that the input voltage lies outside of the predetermined voltage range then 507 is performed. At 505, the voltage regulator is operated in the pass-through mode, where buck switches and boost switches of the voltage regulator are operated at low frequency. At 507, it is determined whether the input voltage is below a minimum voltage value (or threshold) of the predetermined voltage range. If it is determined that the input voltage is below a minimum voltage value at 509 the voltage regulator is operated in boost mode where buck switches are operated at low frequency and boost switches are operated at high frequency. However, if it is determine that the input voltage is not below a minimum value (e.g., is above a minimum value) then at 511 the voltage regulator is operated in buck mode where the boost switches are operated at low frequency and the buck switches are operated at high frequency.

Figure 6:
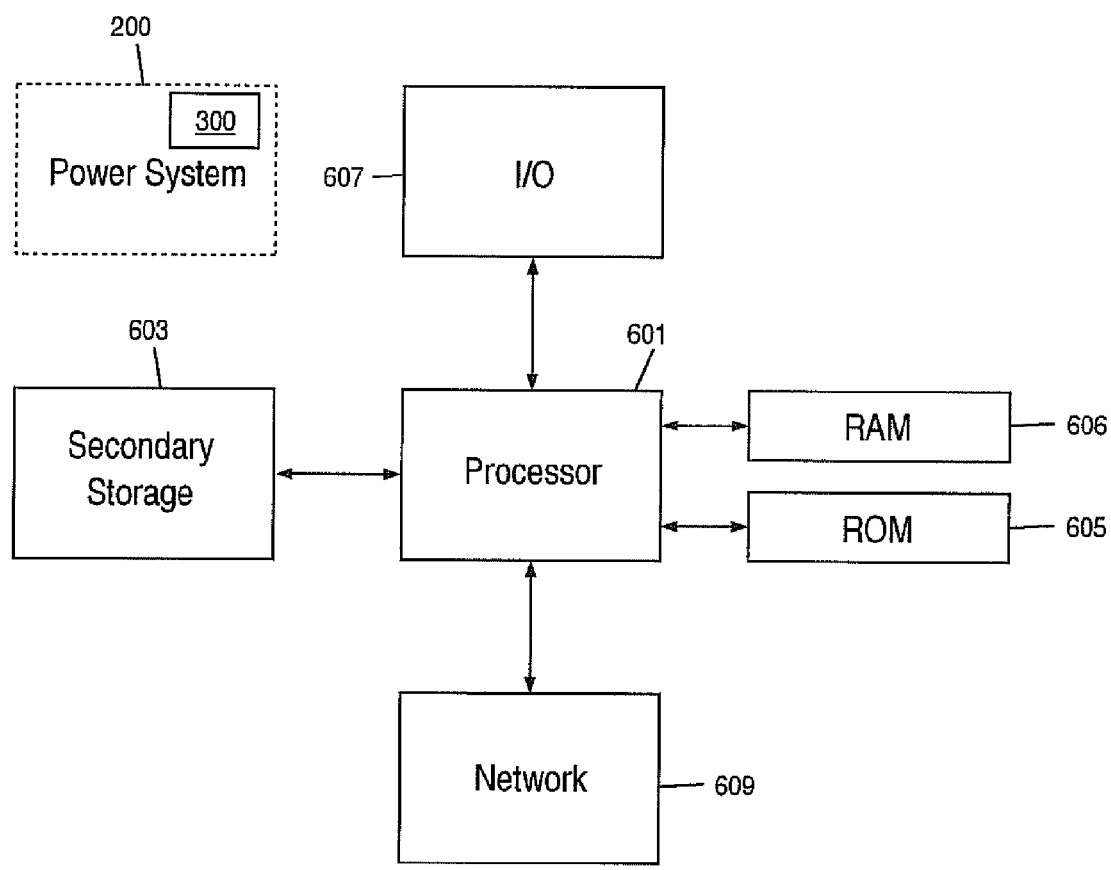
FIG. 6 shows components of electronic equipment suitable for implementing one or more embodiments disclosed herein.

Exemplary Electronic Equipment for a Buck-Boost Regulator Having Dual Frequency Control with a Pass Through Band According to One Embodiment FIG. 6 shows components of electronic equipment 100 (e.g., general purpose networking equipment) suitable for implementing one or more embodiments disclosed herein. In one embodiment electronic equipment 100 can include power system 200, which can include non-isolated buck-boost regulator 300 as shown in FIG. 6, processor 601, secondary storage 603, read only memory (ROM) 605, random access memory 606 (RAM), input/output devices 607 and network connectivity devices 609. In one embodiment, processor 601 can be implemented as one or more CPU chips, or can be part of one or more application specific integrated circuits. In one embodiment, power system 200 provides power to one or more of the components of electronic equipment 100.

Exemplary Simulation for a Buck-Boost Regulator Having Dual Frequency Control with a Pass Through Band According to One Embodiment FIGS. 7-10 show input lead current waveforms for first and second buck-boost regulators that are coupled in parallel for simulation purposes. In the FIG. 7-10 simulations, the feed resistance is 2.5 milli ohm for the first buck-boost regulator and 10 milli ohm for the second buck-boost regulator. Moreover, the input voltage is 40V, the output voltage is 50V and the total load current is 80 A. The circuit operates in boost mode. For first the buck-boost regulator the duty cycle of boost switch S4 (353b in FIG. 2B) is equal to 0.275 and the duty cycle of buck switch S1 (351a in FIG. 2B) is equal to 0.95. Moreover, for the second buck-boost regulator the duty cycle of boost switch S4 (353b in FIG. 2B) is equal to 0.283 and the duty cycle of buck switch S1 (351a in FIG. 2B) is equal to 0.95.

Figure 7:
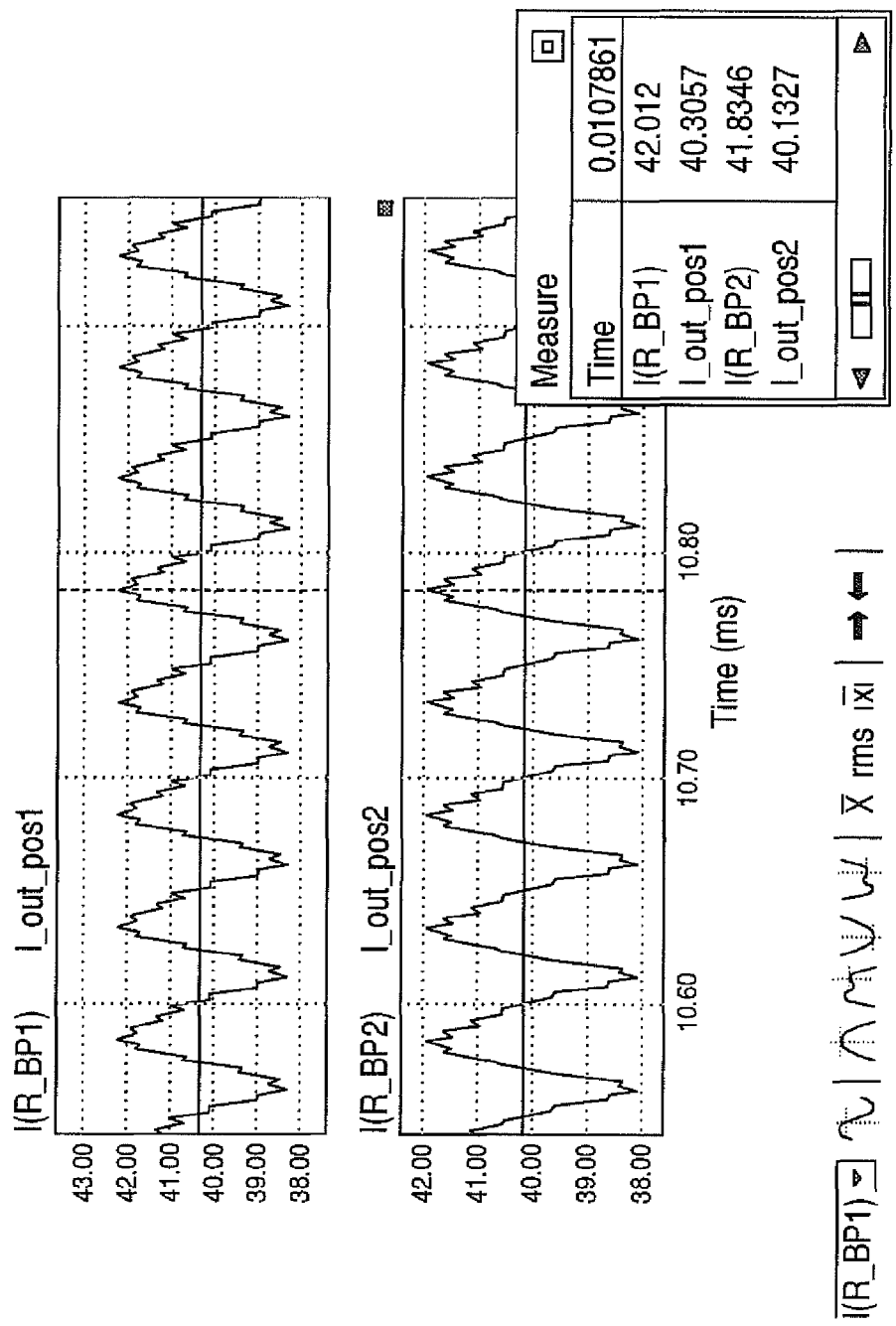
FIG. 7 shows positive input lead current waveforms for first and second buck-boost regulators that are coupled in parallel.

FIG. 7 shows positive input lead current waveforms for first and second buck-boost regulators (e.g., 300 in FIG. 1A) that are coupled in parallel and operate based on the aforementioned conditions. Referring to FIG. 7 the top screen shows a positive input lead current waveform for the first buck-boost regulator that corresponds to a positive input lead current of 40.3 and a positive input lead current waveform for the second buck-boost regulator that corresponds to a positive input lead current of 40.1 A. In one embodiment, satisfactory current sharing is achieved when the magnitude of the difference between lead currents lies within a current range that is equal to about ten percent of the input current magnitude. In the instant case for an input current of 80 A that range is 8 A. Consequently, in the instant case where the resulting positive input lead current is 40.3 A for the first buck-boost regulator and 40.1 A for the second buck-boost regulator (a difference of 0.2 A) satisfactory current sharing of positive input lead currents is achieved.

Figure 8:
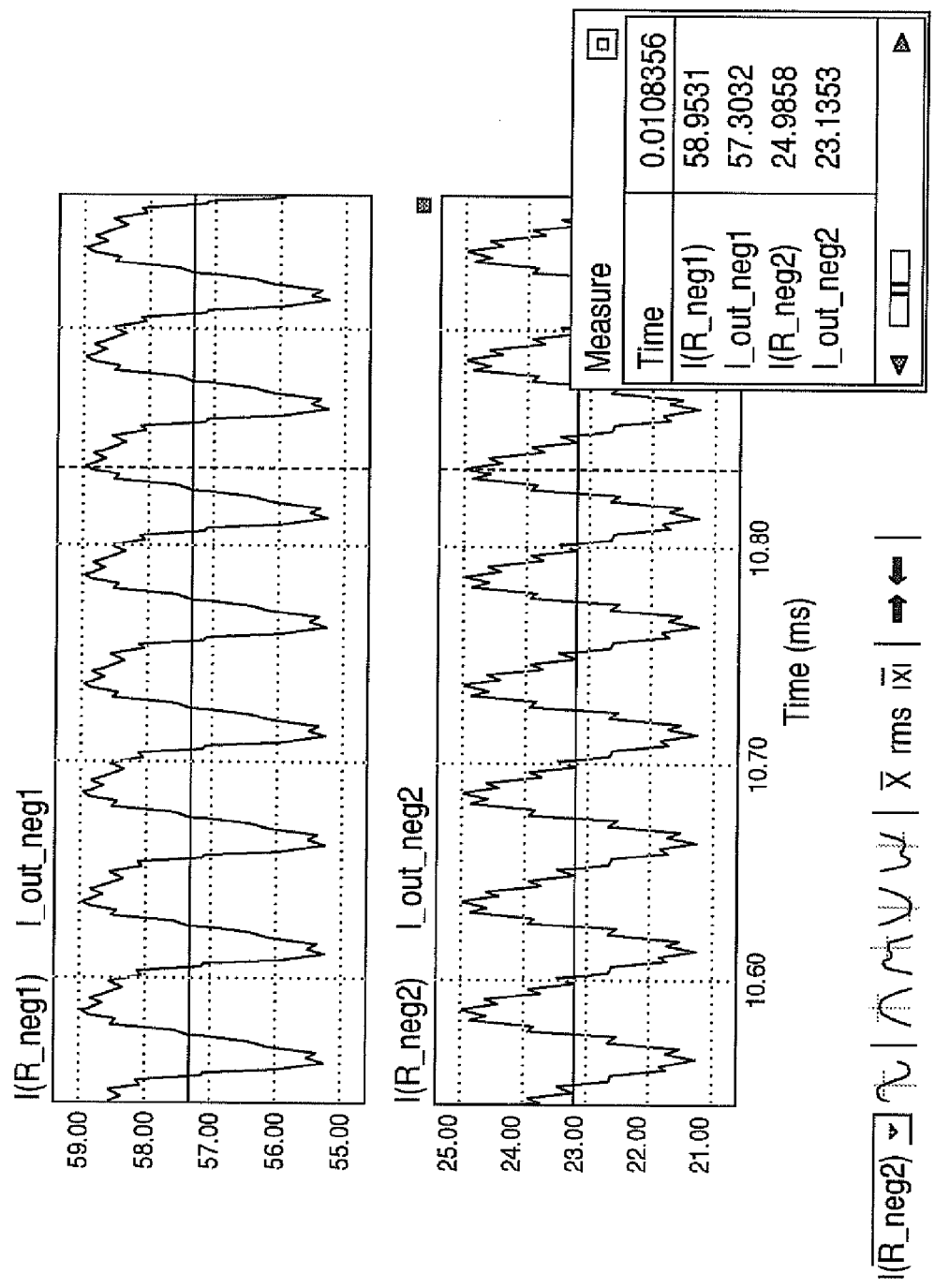
FIG. 8 shows negative input lead current waveforms for first and second buck-boost regulators that are coupled in parallel.
Figure 9:
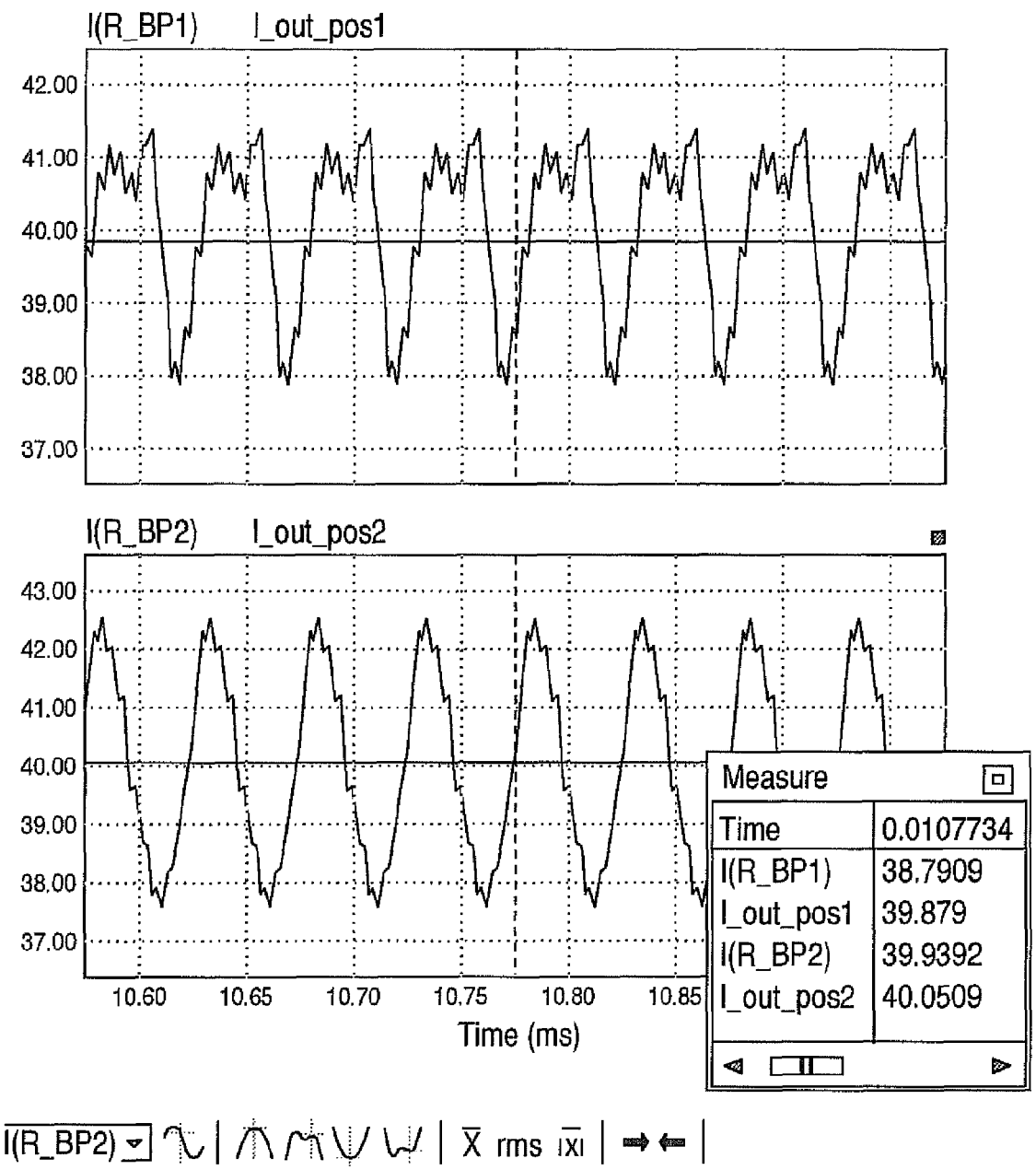
FIG. 9 shows positive input lead current waveforms for first and second exemplary buck-boost regulators that are coupled in parallel according to one embodiment.
Figure 10:
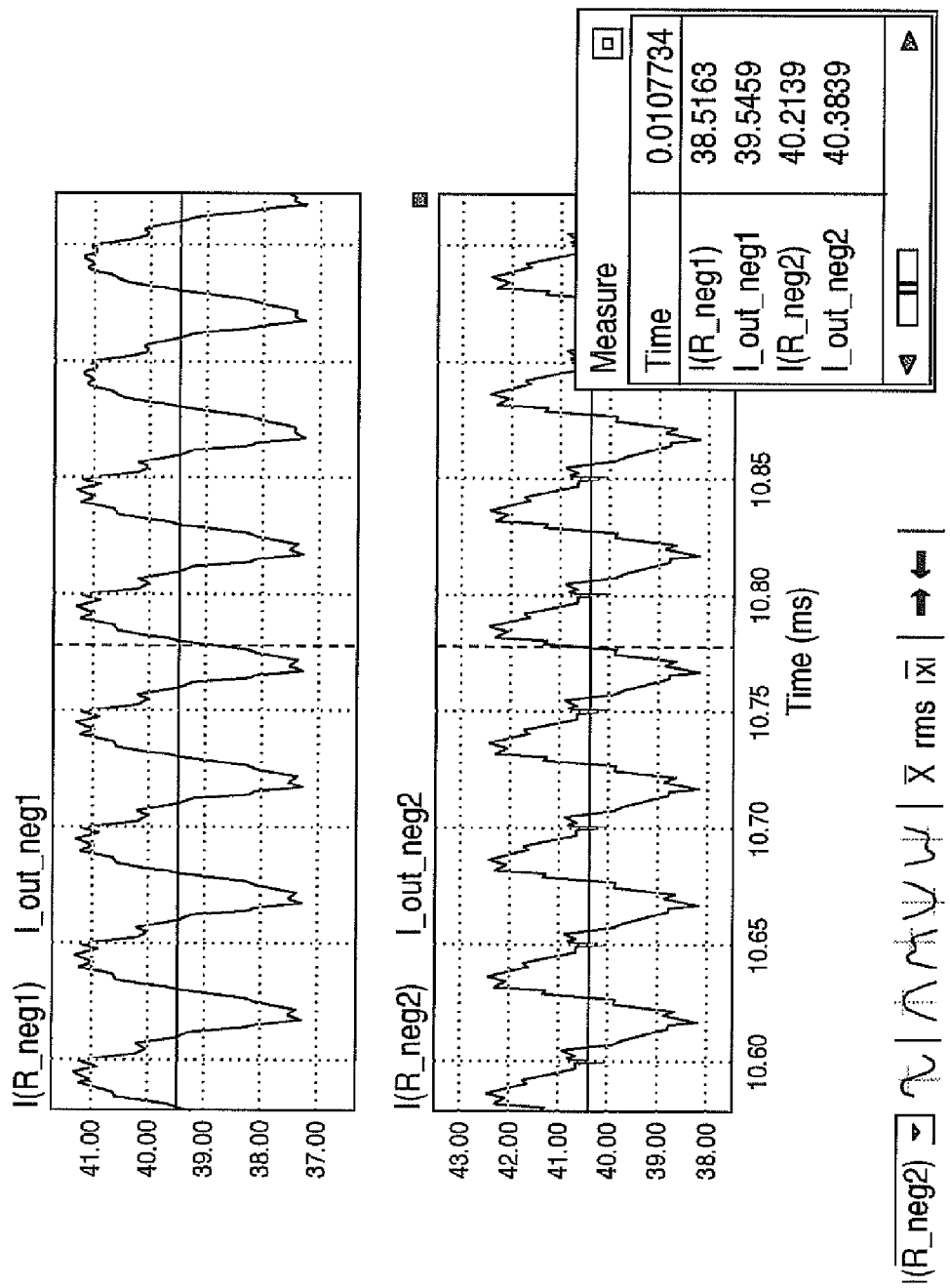
FIG. 10 shows negative input lead current waveforms for first and second exemplary buck-boost regulators that are coupled in parallel according to one embodiment.

FIG. 8 shows negative input lead current waveforms for first and second buck-boost regulators that are coupled in parallel and operate based on the aforementioned conditions. Referring to FIG. 8 the top screen shows a negative input lead current waveform for the first buck-boost regulator that corresponds to a negative input lead current of 57.3 A and a negative input lead current waveform for the second buck-boost regulator that corresponds to a negative input lead current of 23.1 A. FIG. 8 shows that the negative input current for the two parallel coupled buck-boost regulators are initially not satisfactorily shared. However, as shown in FIG. 9, in exemplary embodiments, satisfactory sharing can be achieved by adjusting the duty cycle of a buck switch where in a first exemplary buck-boost regulator the duty cycle of boost switch S4 is equal to 0.275 and the duty cycle of buck switch S1 is adjusted to 0.9405. And, in a second exemplary buck-boost regulator the duty cycle of boost switch S4 is equal to 0.283 and the duty cycle of buck switch S1 is equal to 0.95. In the FIG. 9 embodiment, based on the adjustments, a positive input lead current of 39.9 A for the first exemplary buck-boost regulator and a positive input lead current of 40.1 A for the second exemplary buck-boost regulator is achieved. Moreover, as shown in FIG. 10, a negative input lead current of 39.5 A for the first exemplary buck-boost regulator and a negative input lead current of 40.4 A for the second exemplary buck-boost regulator is achieved.

The above simulation shows that according to one embodiment, by adjusting the duty cycle of a buck switch, the negative input lead current is caused to follow the positive input lead current and thus a satisfactory sharing (e.g., equal sharing or substantially equal sharing) of both the positive input lead current and the negative input lead current is achieved. In one embodiment, similar results are obtained for buck mode operation (current waveforms not shown), where satisfactory current sharing for both positive input leads and negative input leads is also be achieved. Given the conditions Vin=60V, V0=50V, where first exemplary buck-boost regulator includes boost switch S4 with a duty cycle equal to 0.0447 and buck switch S1 with a duty cycle equal to 0.82; and second exemplary buck-boost regulator includes boost switch S4 that has a duty cycle equal to 0.05 and buck switch S1 with a duty cycle equal to 0.823, the positive input lead current is 40.0 A for the first regulator and 40.0 A for the second regulator and the negative input lead current is 39.6 A for the first regulator and 40.6 A for the second regulator. Consequently, in the instant case where the resulting positive input lead current is 40.0 A for the first exemplary buck-boost regulator and 40.0 A for the second exemplary buck-boost regulator, and the resulting negative input lead current is 39.6 A for the first exemplary buck-boost regulator and 40.6 A for the second exemplary buck-boost regulator, satisfactory current sharing of both positive and negative input lead currents is achieved.

In one embodiment, dual frequency control for multiple-switch power converters such as 4-switch buck-boost regulators or buck plus boost regulators is disclosed. In one embodiment, a pair of switches operate at high frequency to control and maximize a main parameter of the power conversion (such as output voltage control), while another pair of switches work at a lower frequency to maximize a secondary parameter of the power conversion, such as the current sharing between multiple regulators when they are operated in parallel. In particular, control is used to implement current sharing of both positive and negative power input leads of a buck-boost regulator with a pass-through band. Within the pass-through band, both pairs of switches operate in a low frequency to achieve the current sharing function on both input leads. It should be appreciated that the above simulation and results are only exemplary and that in other simulations other results can be obtained that are consistent with one or other embodiments.

In one embodiment, in pass-through mode, because the frequency of the pass-through switches is caused to be low, power loss is low. Also, the high duty cycle at which such pairs are operated ensures that power is passed almost constantly from input to output. As such, current ripple and EMI performance is caused to be satisfactory. Moreover, high power loss is avoided. Additionally, because the switches are not required to work at 100 percent duty cycle, the gate drive circuit is easier to design, and its cost is lower.

With reference to exemplary embodiments thereof, a buck-boost regulator with dual-frequency control of first and second switching circuitry is disclosed. The buck-boost regulator includes first switching circuitry that is operated at a first frequency and second switching circuitry that is coupled to the first switching circuitry and operated at a second frequency. The first frequency and the second frequency are different in buck mode and boost mode but can be equal in pass-through mode.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A buck-boost regulator with dual-frequency control of switching circuitry, comprising:
    a first switching circuitry operated at a first frequency; and
    a second switching circuitry operated at a second frequency and coupled to said first switching circuitry,
    wherein said first frequency and said second frequency are greater than zero, and different in buck mode and boost mode,
    wherein in buck mode and in boost mode one of said first frequency and said second frequency has a rate more than double that of the other of said first frequency and said second frequency, and said first and said second switching circuits operate continuously and are not turned off, and
    wherein said first switching circuitry comprises a first switch positioned between an input terminal and an output terminal of a positive lead of said buck-boost regulator.

2. The regulator of claim 1 wherein in said buck mode and said boost mode, one of said first and said second switching circuitry is operated at a frequency that is higher by an order of magnitude than a lower frequency at which the other of said first and said second switching circuitry is operated.

3. The regulator of claim 2 wherein in a pass-through mode both said first and said second switching circuitry operate at said lower frequency and perform current balancing between input leads of said regulator and current sharing between said regulator and other parallel coupled regulators.

4. The regulator of claim 2 wherein said one of said first and said second switching circuitry that is operated at said frequency that is higher performs output voltage regulation.

5. The regulator of claim 2 wherein said other of said first and said second switching circuitry that is operated at said lower frequency performs balancing of input lead current.

6. The regulator of claim 2 wherein a first switch of said other one of said first and said second switching circuitry is operated at a duty cycle that is greater than that of a second switch of said other one of said first and said second switching circuitry.

7. The regulator of claim 1 further comprising a controller that is configured to cause said first switching circuitry and said second switching circuitry to operate at said first frequency and said second frequency.

8. The regulator of claim 1 wherein said first frequency and said second frequency are equal in pass-through mode.

9. The regulator of claim 1 wherein in said boost mode said first frequency is 200 Khz and said second frequency is 20 Khz and in said buck mode said first frequency is 20 Khz and said second frequency is 200 Khz.

10. An electronic device, comprising:
a processor;
a memory; and
a power system for providing power to said processor and said memory, wherein said power system comprises:
power input and output terminals;
a plurality of parallel coupled voltage regulators that comprise a voltage converter with dual-frequency control of first and second switching circuitry, said voltage converter comprising:
a first switching circuitry operated at a first frequency; and
a second switching circuitry coupled to said first switching circuitry and operated at a second frequency,
wherein said first frequency and said second frequency are greater than zero, and different in buck mode and boost mode, wherein in buck mode and in boost mode one of said first frequency and said second frequency has a rate more than double that of the other of said first frequency and said second frequency, and said first and said second switching circuits operate continuously and are not turned off, and wherein said first switching circuitry comprises a first switch positioned between an input terminal and an output terminal of a positive lead of said buck boost regulator.

11. The device of claim 10 wherein in said buck and boost mode one of said first and said second switching circuitry is operated at a frequency that is higher by an order of magnitude than a lower frequency at which the other of said first and said second switching circuitry is operated.

12. The device of claim 11 wherein in said pass-through mode both said first and said second switching circuitry operates at said lower frequency and performs current balancing between said input terminals of said converter and current sharing between said converter and other parallel coupled converters.

13. The device of claim 11 wherein said one of said first and said second switching circuitry that is operated at said frequency that is higher performs output voltage regulation.

14. The device of claim 11 wherein said other of said first and said second switching circuitry that is operated at said lower frequency performs balancing of input lead current.

15. The device of claim 10 further comprising a controller that is configured to cause said first switching circuitry and said second switching circuitry to operate at said first frequency and said second frequency.

16. The device of claim 10 wherein said first frequency and said second frequency are equal in pass-through mode.

17. A method for dual-frequency control of switching circuitry of a buck-boost voltage regulator, comprising:
operating a first switching circuitry at a first frequency; and
operating a second switching circuitry at a second frequency,
wherein said first frequency and said second frequency are greater than zero, and different in buck mode and boost mode,
wherein in buck mode and in boost mode one of said first frequency and said second frequency has a rate more than double that of the other of said first frequency and said second frequency, and said first and said second switching circuits operate continuously and are not turned off, and
wherein said first switching circuitry comprises a first switch positioned between an input terminal and an output terminal of a positive lead of said buck-boost regulator.

18. The method of claim 17 wherein in said buck and boost mode one of said first and said second switching circuitry is operated at a frequency that is higher by an order of magnitude than a lower frequency at which the other of said first and said second switching circuitry is operated.

19. The method of claim 18 wherein in said pass-through mode both said first and said second switching circuitry operates at said lower frequency and performs current balancing between input leads of said buck-boost regulator and between said buck-boost regulator and other parallel coupled buck-boost regulators.

20. The method of claim 17 wherein said first frequency and said second frequency are equal in pass-through mode.

* * * * *